United States Patent Office 3,698,956
Patented Oct. 17, 1972

3,698,956
ALKALINE ELECTROLYTE-ZINC ANODE AIR-DEPOLARIZED BATTERY
Masayuki Emoto, Tokyo, and Yoshiyuki Maki, Fujisawa, Japan, assignors to Hitachi Limited, Tokyo-to, Japan
Filed July 10, 1970, Ser. No. 53,737
Claims priority, application Japan, July 14, 1969, 44/55,665
Int. Cl. H01m 29/04
U.S. Cl. 136—86 A                    4 Claims

ABSTRACT OF THE DISCLOSURE

An air-depolarized battery of the alkaline electrolyte-zinc anode type, in which an alkaline electrolyte-zinc anode composed of amalgamated zinc powder, alkali metal electrolyte and one or more kinds of alkaline earth metal hydroxide in combination at a given proportion is utilized.

BACKGROUND OF THE INVENTION

This invention relates to an alkaline air battery and, more particularly, to an air battery of the alkaline electrolyte-zinc anode type, in which an alkaline electrolyte-zinc anode composed of amalgamated zinc powder, alkali electrolyte and alkaline earth metal hydroxide is used.

Alkaline air-depolarized battery utilizes oxygen contained in air as the depolarizer with the result that the cathode thereof to activate the oxygen gas is to be always exposed in air regardless of the shape of the battery, and therefore that it is in the state of being easily absorbed in the alkali electrolyte as well as of being prone to contact with carbon dioxide gas present in air and liable to change it to carbonate. In general, carbon dioxide gas which permeates into the air battery through the cathode has been known to react with the electrolyte to produce carbonate of low solubility, and causes various mal-effects such as consumption of the electrolyte, lowering of ionic conduction, bringing the zinc anode into a passive state.

In order to prevent deterioration in performance of the alkali electrolyte due to absorption of carbon dioxide gas, many a proposal has been made as to addition of hydroxide powder of alkaline earth metals to the alkali electrolyte. Some of the instances are: (1) addition of hydroxide powder of alkaline earth metals to the combined anode and electrolyte, in which zinc powder is dispersed in gellous alkali zincate; (2) provision of hydroxide of alkaline earth metal at the bottom portion of the battery container together with fibrous material; or (3) mixing of hydroxide powder of alkaline earth metals with alkali electrolyte.

On the other hand, in alkaline storage battery, there is one type, in which hydroxide of alkaline earth metal is added to the alkali electrolyte to attain both purposes of eliminating carbonate produced by absorption of carbon dioxide gas and regeneration of the alkali electrolyte. Examples of this type are: (I) addition of hydroxide of alkaline earth metal to the alkali electrolyte; and (II) use of an anode prepared by mixing and kneading hydroxide of alkaline earth metal, zinc powder, and water, then applying the mixture to wire net, drying the same, and inserting it into the electrolyte.

In the case of (I) and (II) mentioned above, the anode is also the electrolyte. The battery in these cases is called the alkaline electrolyte-zinc anode type.

Notwithstanding various attempts heretofore made as mentioned in the foregoing, the intended purpose of preventing deterioration in the electrolytic performance has not been able to be achieved perfectly. That is, in the case of adding hydroxide of alkaline earth metal to the combined anode and electrolyte prepared by dispersing zinc powder into alkali zincate gel, those gelling agents such as carboxymethyl cellulose, polyvinyl alcohol, sodium alginate, etc. are not stable in the alkaline electrolyte with the consequence that they tend to gradually become low molecular substance to lose capability of holding alkali electrolyte, thereby causing the so-called syneresis phenomenon of the alkali electrolyte, which accelerates leakage of the alkali electrolyte, or irregular distribution of the anode zinc due to lowering of the viscosity of electrolyte, which is liable to local swelling of the battery. The gelling agents such as polyvinyl alcohol, sodium alginate, etc. immediately turn into gel when they are added to the alkali electrolyte, however small their amount may be, and tend to assume a solid form. This property of the gelling agents extremely narrows the selection range of the adding quantity, and assembly work of the battery becomes difficult. While sodium polyacrylate is excellent in its stability in the alkali electrolyte, its alkali electrolyte holding capability is extremely inferior, which makes it difficult to impregnate the alkali electrolyte in it in an amount necessary for the battery reaction. Besides these defects as enumerated above, these substances have in common such drawbacks as to remarkably reducing the contact area with carbon dioxide gas or carbonate, as they completely cover the powder surface of the hydroxide of alkaline earth metal. On the other hand, in the batteries of the type, wherein the hydroxide of alkaline earth metal is added to the alkali electrolyte, or it is placed at the bottom of the battery container together with appropriate fibrous substance, sufficient effect cannot be expected in respect of the action to carbonate and the preventive action against zinc oxidation due to oxygen gas rendered by the hydroxide of the alkaline earth metal. The reason for this is that, since the anode zinc or other anodic active substance, hydroxide of alkaline earth metal and alkaline electrolyte are not in a state of being kneaded intimately, in other words, each of the three components is present individually or in combination of any of the two components such as alkaline earth metal and the anode zinc, or alkaline earth metal and the alkali electrolyte, the value of short-circuit current is inevitably small.

In view of the afore-described problems, an ideal anode for the alkaline air-depolarized battery should preferably be such one that is capable of perfectly fixing as quick as possible carbon dioxide or carbonate produced from absorption of carbon dioxide; of having large alkali electrolyte holding capability, i.e., constantly retaining sufficient amount of the alkali electrolyte on the powder surface of the anode zinc; of having small electrical resistance; of maintaining required quality over long period of conservation; of having high utility of the anode zinc; of having properly determined viscosity; and of facilitating manufacture of the anode as well as assembly work of the battery.

SUMMARY OF THE INVENTION

It is therefore the primary object of the present invention to provide an alkaline air-depolarized battery of the alkaline electrolyte-zinc anode type having large electrolyte holding capability.

It is the secondary object of the present invention to provide an alkaline air-depolarized battery of the alkaline electrolyte-zinc anode type which is durable for a long period of storing.

It is the tertiary object of the present invention to provide an alkaline air-depolarized battery of the alkaline electrolyte-zinc anode type having high utility of the anode zinc.

It is the quaternary object of the present invention to provide an alkaline air-depolarized battery of the alkaline electrolyte-zinc anode type having viscosity of an appropriate degree to facilitate manufacture of the anode as well as assemblage of the battery.

The foregoing objects and other objects of the present invention as well as the characteristic features thereof will become more apparent from the following detailed description of the invention when read in conjunction with the accompanying drawing.

DETAILED DESCRIPTION OF THE INVENTION

The alkaline air-depolarized battery of the present invention is of an alkaline electrolyte-zinc anode type prepared by mixing and kneading uniformly an alkali-metal electrolyte, one or more kinds of hydroxide of alkaline earth metal at a mixing ratio of 10 to 70% by weight with respect to the alkali-metal electrolyte, and amalgamated zinc at a mixing ratio (by weight) ranging from 4:6 to 2:8 with respect to the alkali electrolyte.

More preferably, the optimum mixing ratio of the hydroxide of alkaline earth metal with respect to the alkali electrolyte ranges from 25 to 40% by weight.

Figure 1:
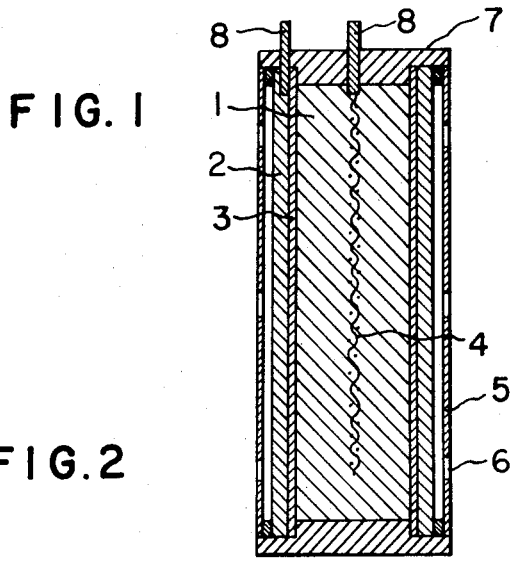
FIG. 1 is a sectional side view of the alkaline air-depolarized battery according to the present invention.

Referring now to FIG. 1 which indicates one structural example of the present invention, the alkaline electrolyte-zinc anode 1 to be described in detail hereinafter is filled in a space defined by two anodes 2 through ion-permeable separators 3. At the center of the space filled with the combined cathode and electrolyte, a collector 4 is inserted, and then a plastic container 5 having air-vents 6 is tightly sealed by a cap 7. The cathode 2 and the collector 4 are respectively provided with a lead for external connection. The cathode 2 is manufactured by impregnating into a porous nickel powder sintered base plate amalgamated silver powder as a catalyst which has previously been dispersed in a suspension of polytetrafluoroethylene as a hydrophobic-agent-binder, and then heat-treating the base plate.

In the above-described battery, an alkali electrolyte-zinc anode prepared in the following recipes and manners is utilized for measuring the capability of the battery.

RECIPE I

|   | Wt. percent |
|---|---|
| Potassium hydroxide (KOH) | 32 |
| Zinc oxide (ZnO) | 5 |
| Water | 63 |

To 350 g. of the alkali of the above composition, 30 to 350 g. of pulverized calcium hydroxide (Ca(OH)$_2$) having particle size of about 10 microns or so is added and kneaded together to prepare a mixed electrolyte.

To 400 g. of this mixed alkaline electrolyte, there is further added 600 g. of 7% amalgamated zinc powder of 50 to 150 mesh size. The batch is further kneaded uniformly to prepare an alkali electrolyte-zinc anode.

Figure 2:
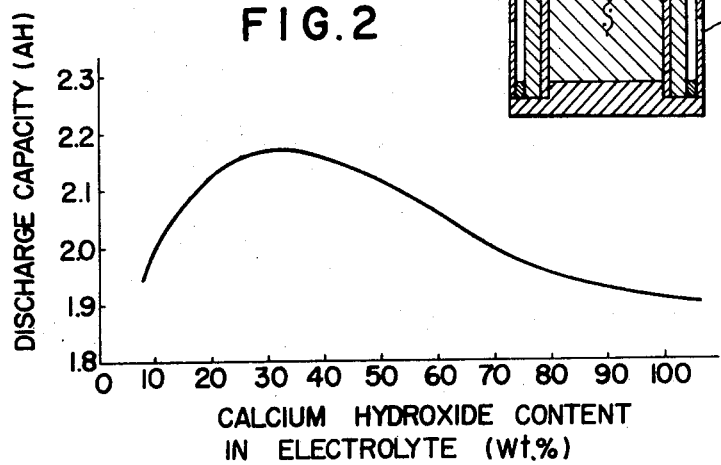
FIG. 2 is a graphical representation showing the relationship between the discharge capacity of the battery and the adding quantity of calcium hydroxide to the alkali electrolyte-zinc anode type to be used for the present invention.

The combined cathode and electrolyte thus obtained and having various compositions is charged into the battery structure shown in FIG. 1, and the performance of the battery was measured. The results are shown in FIG. 2. In this graphical representation, the abscissa denotes the adding quantity in percent by weight of calcium hydroxide with respect to the alkali and the ordinate represents the discharge capacity in ampere per hour of the battery at the time of its discharging at a constant resistance of 4 ohms, the quantity of the mercury used in amalgamated zinc powder being 3.4 g.

It is seen from this graph that the discharge capacity increases relatively abruptly at the first stage with increase in the addition quantity of calcium hydroxide, reaches its maximum in the vicinity of approximately 32 wt. percent of addition quantity, and then gradually lowers beyond this addition quantity.

Incidentally, rough relationship between the adding quantity of calcium hydroxide to the alkali electrolyte and the condition of the mixed electrolyte is such that, at about 10 wt. percent or less of the adding quantity, the mixed electrolyte assumes a milky state, at about 10 to 70 wt. percent, it is creamy, and, above 70 wt. percent, it becomes muddy.

Now considering the cases wherein amalgamated zinc powder is mixed with this mixed electrolyte assuming any one of the above-mentioned various conditions. If the mixed electrolyte is in a milky state, the electrolyte and the amalgamated zinc are easily isolated, the condition of which is very poor in workability and therefore is not suitable for industrial mass production.

With the mixed electrolyte in a muddy condition, the mixture of the electrolyte and the amalgamated zinc becomes coagulated, which causes various defects such as reduction in the quantity of amalgamated zinc per battery, lowering in utility of zinc, and so forth.

Contrary to this, when the mixed alkaline electrolyte is in a creamy state, it assumes milkly white in color and is extremely soft having ideal viscosity. With such state of the mixed alkaline electrolyte, the surface of the amalgamated zinc powder is properly wetted by the alkali electrolyte through the kneading operation, and, at the same time, are coated almost perfectly with fine particles of calcium hydroxide. Although the viscosity of the alkali electrolyte-zinc anode thus produced becomes lower than that of the mixed alkaline electrolyte before zinc powder is added thereto, the retainability of its shape increases inversely.

Consequently, in consideration of FIG. 2 and the conditions of the mixed alkaline electrolyte, the preferable range of the adding quantity of calcium hydroxide with respect to the alkali electrolyte is from 10 to 70% by weight, and the optimum range thereof is from 25 to 40% by weight.

Figure 3:
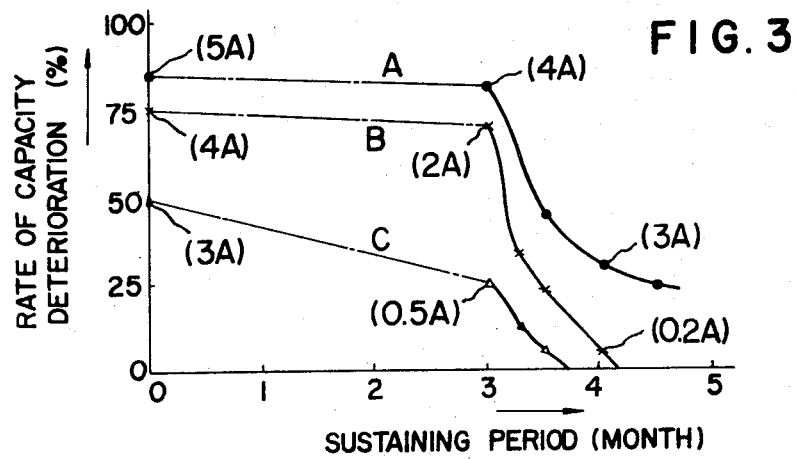
FIG. 3 is a graphical representation showing comparison of capability of the battery according to the present invention and conventional batteries.

FIG. 3 is a comparison of performance among three types of batteries A, B, and C. The battery A is of the present invention utilizing the alkali electrolyte-zinc anode in which the ratio of the alkali electrolyte and calcium hydroxide is 7:1 by weight. The battery B is one, in which the alkali electrolyte-zinc anode used is prepared by first gelling amalgamated zinc powder of same grain size as that used in the battery A together with 3% carboxymethyl cellulose, then mixing and kneading the gelled amalgamated zinc and 32% aqueous solution of potassium hydroxide, in which 5% of zinc oxide is dissolved, at a mixing ratio of 4:6, and adding to this mixture calcium hydroxide powder in an amount corresponding to 5% to the total quantity of the mixture, the batch being uniformly kneaded and shaped into the same configuration as that of the battery A. The battery C is one, in which the anode used is prepared by shaping amalgamated zinc powder of same grain size as that used in the batteries A and B together with a collector disposed as its center; while, the electrolyte is prepared by adding to 32% aqueous solution of potassium hydroxide, in which 5% of zinc oxide is dissolved, calcium hydroxide powder in an amount corresponding to 5% to the total quantity of the aqueous solution of potassium hydroxide, kneading and shaping the mixture in the same configuration as that of the batteries A and B.

The test conditions of these batteries are that they are tightly sealed and kept for 3 months at a temperature of 45° C., thereafter this tightly sealed condition is released and the batteries are left at a room temperature. The discharge capacity of the respective batteries is measured immediately after the sealing-off the, comparative results of which are shown in FIG. 3. In FIG. 3, the ordinate represents the comparative values of the discharge capacity in terms of rate of utility of the cathode zinc, and the abscissa denotes the period for storing the batteries. The numerals in parenthesis at each number of the respective months at each point of measurements are the values of short-circuit current immediately prior to commencement of the discharge.

As is apparent from FIG. 3, the battery A clearly indicates its characteristics that the rate of utility of the cathode zinc is extremely high and the short-circuit current is large in comparison with other two batteries B and C. In the battery B, the rate of deterioration of discharge capacity with respect to storing period (storage rate) under the tightly sealed condition is comparatively satisfactory. However, remarkable deterioration in its performance is seen immediately after the release from the tight seal. The battery C indicates remarkable deterioration in its performance even in its storing under the tightly sealed condition or under the open condition. Further, in the battery B, when it is kept as long as one year under the tightly sealed condition at a normal temperature, the gelling agent of carboxymethyl cellulose is peptized to lower its electrolyte holding capability with the consequent leakage of 7% of the number of the battery tested. In the battery C, as the alkali electrolyte is not kneaded integrally with zinc powder in its entirety, 11% of the number of the battery tested caused leakage of the gelling agent. In contrast thereto, the battery A shows the least deterioration in its performance under the tightly sealed conditions, and even after its opening, it maintained excellent serviceability, and as the alkali electrolyte is stable enough to be held by the hydroxide, the alkali electrolyte leakage reduced considerably, which is as low as 2.5% of the number of the battery tested.

In the afore-described mixed electrolyte, in order to obtain more uniform creamy electrolyte, calcium hydroxide is further pulverized, or the alkali electrolyte is heated to a temperature of 100 to 130° C., to which calcium hydroxide powder is added and vigorously agitated, or calcium oxide of coarse grain size is added to the alkali electrolyte and, in taking advantage of the exothermic reaction to take place for calcium hydroxide to react with water to convert into calcium hydroxide, pulverization of calcium hydroxide is accelerated.

RECIPE II

| | Wt. percent |
|---|---|
| Potassium hydroxide (KOH) | 33 |
| Water | 67 |

To 300 g. of the alkali electrolyte of the above composition, there are added 12 g. of zinc oxide (ZnO), 80 g. of magnesium hydroxide ($Mg(OH)_2$) pulverized to about 5 microns, and 30 g. of barium oxide (BaO) having particle size of about 3 microns. The batch is kneaded, while heating, to obtain a mixed alkaline electrolyte of a creamy condition. The mixed electrolyte assumes milky white color, is smooth, and has an appropriate viscosity. To 400 g. of this mixed electrolyte, 600 g. of 7% amalgamated zinc powder having 50–150 mesh size is added, and the mixture is further kneaded to obtain the alkaline electrolyte-zinc anode. The total quantity of addition of both magnesium hydroxide and barium oxide is approximately 26% to the creamy mixed alkaline electrolyte, and approximately 10% of the alkaline electrolyte-zinc anode.

The characteristics of the alkaline air-depolarized battery according to the present invention are substantially same as that shown in FIG. 3.

In the afore-described two recipes for the alkaline electrolyte-zinc anode, two examples have been shown, wherein, as the hydroxide as well as oxide of alkaline earth metal, calcium hydroxide is singly added to the alkali electrolyte, and a mixture of both magnesium hydroxide and barium oxide is added to the alkali electrolyte. The hydroxides or oxides of alkaline earth metal that produce creamy alkaline electrolyte favorable to produce the alkaline electrolyte-zinc anode through kneading are those of calcium and magnesium. While hydroxide and oxide of barium and strontium are excellent in their capability of adsorption and fixation of carbon dioxide gas or carbonate, they have large solubility in alkaline electrolyte, hence it accompanies difficulty in obtaining creamy electrolyte. Furthermore, as they are costlier than the hydroxide and oxide of calcium and magnesium, it is a desirable way of use that they be mixed with hydroxide and oxide of calcium and magnesium, rather than using them singly.

The air battery utilizing the alkaline electrolyte-zinc anode added with hydroxide of alkaline earth metal is higher in its utility of zinc than that utilizing organic fillers, and possesses relatively large discharge capacity even when the quantity of the alkali electrolyte decreases, so that the mixing quantity of the amalgamated zinc to obtain better battery performance is in the range of from 4:6 to 2:8 with respect to the alkali electrolyte.

Accordingly, the hydroxide and oxide of alkaline earth metal and their adding quantity can be selected in a most wide range to best suit various configuration the battery can take such as cylindrical, flat, and so on.

As stated in the foregoing, the alkaline electrolyte-zinc anode for use in the alkali air-depolarized battery of the present invention is prepared by mixing and kneading the alkaline electrolyte and one or more kinds of hydroxide of alkaline earth metal to obtain a creamy mixed electrolyte, to which zinc powder is uniformly mixed and kneaded. In this case, as fine particles of creamy hydroxide of alkaline earth metal are uniformly dispersed throughout the alkaline electrolyte-zinc anode, the carbon dioxide gas or carbonate produced by absorption of carbon dioxide gas can be rapidly fixed to prevent zinc anode from becoming passive, and the hydroxides are not subjected to change at all by the alkaline electrolyte. In other words, as the hydroxide has sufficient alkali-resistance and electrolyte holding capability, the alkali electrolyte in sufficient and constant quantity is always present in the vicinity of the zinc powder, which contributes to superiority in the retainability of the battery, discharge utility of zinc, as well as short-circuit current. Moreover, as the alkali electrolyte can be made creamy by simply adding hydroxide and oxide of alkaline earth metal to the alkali electrolyte, the manufacture thereof is facilitated, and viscosity and shape retainability of the alkaline electrolyte-zinc anode render the assembly work of the battery extremely easy.

What we claim is:

1. Alkaline air-depolarized battery comprising: a container having a bottom and walls to define a container space; at least one air vent provided on the container walls; a cathode disposed inside the container; a separator provided adjacent the cathode; an alkaline electrolyte-zinc anode filling the remaining space in the container isolated from the cathode through the separator; a collector inserted in the alkaline electrolyte-zinc anode; and lead wire attached to each of the cathode and the collector, said alkaline electrolyte-zinc anode consisting of uniformly dispersed and kneaded mixture of alkali metal electrolyte, hydroxide of at least one alkaline earth metal in an amount of 10 to 70% by weight with respect to the alkali metal electrolyte, and amalgamated zinc powder in an amount ranging from 4:6 to 2:8 with respect to the alkali metal electrolyte.

2. Alkaline air-depolarized battery comprising: a container having a bottom and walls to define a container space; at least one air vent provided on the container walls; a cathode disposed inside the container; a separator provided adjacent the cathode; an alkaline electrolyte-zinc anode filling the remaining space in the container isolated from the cathode through the separator; a collector inserted in the alkaline electrolyte-zinc anode and lead wire attached to each of the cathode and the collector, said alkaline electrolyte-zinc anode consisting of uniformly dispersed and kneaded mixture of alkali metal electrolyte, hydroxide of at least one alkaline earth metal in an amount of 25 to 40% by weight with respect to the alkali metal electrolyte, and amalgamated zinc powder in an amount ranging from 4:6 to 2:8 with respect to the alkali metal electrolyte.

3. Alkaline air-depolarized battery as defined in claim 1, in which the hydroxide of alkaline earth metal is at least one selected from group consisting of calcium hydroxide and magnesium hydroxide.

4. Alkaline air-depolarized battery as defined in claim 2, in which the hydroxide of alkaline earth metal is at least one selected from group consisting of calcium hydroxide and magnesium hydroxide.

References Cited

UNITED STATES PATENTS

| | | | |
|---|---|---|---|
| 3,553,024 | 1/1971 | Fishman | 136—86 D |
| 1,864,652 | 6/1932 | Heise | 136—154 |
| 3,392,057 | 7/1968 | Sakagami et al. | 136—86 D |
| 3,427,203 | 2/1969 | Fletcher | 136—125 X |
| 3,513,030 | 5/1970 | Rosansky et al. | 136—86 A |
| 3,516,862 | 6/1970 | Van Der Grinten | 136—30 |

ALLEN B. CURTIS, Primary Examiner

U.S. Cl. X.R.

136—125